United States Patent
Babcock (10) Patent No.: US 10,654,114 B2
(45) Date of Patent: May 19, 2020

(54) MICRO-PECK FEED DRILL CLUTCH

(71) Applicant: Lockheed Martin Corporation, Bethesda, MD (US)

(72) Inventor: Blake Forrest Babcock, Fort Worth, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 16/003,835

(22) Filed: Jun. 8, 2018

(65) Prior Publication Data

US 2019/0375068 A1    Dec. 12, 2019

(51) Int. Cl.
| | |
|---|---|
| B23B 47/34 | (2006.01) |
| B23Q 5/32 | (2006.01) |
| B23B 45/00 | (2006.01) |
| B23B 35/00 | (2006.01) |

(52) U.S. Cl.
CPC ............ *B23B 45/008* (2013.01); *B23B 35/00* (2013.01); *B23Q 5/326* (2013.01); *B23B 47/34* (2013.01); *Y10T 408/23* (2015.01)

(58) Field of Classification Search
CPC ............ Y10T 408/23; Y10T 408/6793; Y10T 408/6791; B23B 47/34; B23B 39/10; B23B 45/008; B23Q 5/326; B23Q 5/265; B23Q 11/04; B23Q 16/003
See application file for complete search history.

(56) References Cited

U.S. PATENT DOCUMENTS

| | | | |
|---|---|---|---|
| 2,630,723 A | | 3/1953 | Gridley |
| 2,791,922 A | * | 5/1957 | Robinson ............... B23Q 5/326 173/19 |
| 2,978,916 A | | 4/1961 | Metcalf |
| 3,018,674 A | | 1/1962 | Kohler |
| 3,024,671 A | | 3/1962 | Madonna |
| 3,119,274 A | * | 1/1964 | Short .................... B25D 11/106 74/22 R |
| 3,443,446 A | | 5/1969 | Buergel |
| 3,609,054 A | * | 9/1971 | Nyman .................. B23Q 5/265 408/17 |
| 3,680,970 A | | 8/1972 | Deschner |
| 4,158,970 A | * | 6/1979 | Laughon ............... B23B 45/008 173/48 |
| 4,159,050 A | * | 6/1979 | Hopkins, Sr. ......... B23B 45/008 192/114 R |
| 4,567,950 A | | 2/1986 | Fushiya et al. |
| 5,054,968 A | * | 10/1991 | Eckman ................. B23B 49/02 408/129 |
| 5,056,607 A | * | 10/1991 | Sanders ............... B25D 16/006 173/109 |

(Continued)

*Primary Examiner* — Ryan C Rufo
(74) *Attorney, Agent, or Firm* — Baker Botts L.L.P.

(57) ABSTRACT

An apparatus includes a spindle, a pecking mechanism, and a clutch mechanism coupled to the pecking mechanism. The spindle includes a drill tool and the spindle is configured to be fed in a first direction during a drilling operation. The pecking mechanism is configured to retract the drill periodically during the drilling operation. The clutch mechanism is configured to selectively engage the pecking mechanism during a portion of the drilling operation. The clutch mechanism is configured to constrain the rotation of the washer such that the spindle drill is retracted a predefined distance periodically.

10 Claims, 4 Drawing Sheets

(56) References Cited

U.S. PATENT DOCUMENTS

| | | | | |
|---|---|---|---|---|
| 5,062,745 | A | * | 11/1991 | Eckman .................. B23Q 5/402 408/15 |
| 5,073,068 | A | * | 12/1991 | Jinkins ................... B23Q 5/265 408/130 |
| 5,149,232 | A | * | 9/1992 | Eckman .................. B23Q 5/402 408/137 |
| 5,215,416 | A | * | 6/1993 | Dessouky .............. B23Q 5/265 408/130 |
| 5,342,152 | A | | 8/1994 | Medeksza |
| 5,533,842 | A | * | 7/1996 | Johnson ................. B23Q 5/265 408/130 |
| 5,653,294 | A | * | 8/1997 | Thurler ................ B25D 11/106 173/13 |
| 6,688,406 | B1 | * | 2/2004 | Wu ........................ B25D 16/00 173/109 |
| 7,124,839 | B2 | * | 10/2006 | Furuta ..................... B25B 21/00 173/104 |
| 7,510,024 | B2 | | 3/2009 | Veres |
| 8,007,210 | B2 | | 8/2011 | Veres |
| 8,721,232 | B2 | | 5/2014 | Peigne |
| 2008/0296036 | A1 | * | 12/2008 | Simm ................... B23B 45/008 173/178 |
| 2009/0067939 | A1 | * | 3/2009 | Carr ....................... B23Q 5/265 408/4 |
| 2010/0111626 | A1 | * | 5/2010 | Myhill .................. B23Q 5/265 408/129 |
| 2010/0163261 | A1 | * | 7/2010 | Tomayko .............. B23B 45/008 173/47 |
| 2017/0136552 | A1 | * | 5/2017 | Fairchild ................ B23B 37/00 |
| 2017/0136590 | A1 | * | 5/2017 | Watford .................. B23Q 5/32 |

\* cited by examiner

MICRO-PECK FEED DRILL CLUTCH

TECHNICAL FIELD

This disclosure relates in general to feed drills, and more particularly to clutch mechanisms for feed drills.

BACKGROUND

Feed drills allow tooling to be fed through the drill while the end of the tooling drills into a piece of material or component. Feed drills may be enabled with pecking mechanisms that retract tooling from the drilled hole before the tooling is fed again to continue drilling deeper into the drilled material. Micro-pecking mechanisms may only retract the tooling a short distance before drilling deeper. Drilling with micro-pecking may damage certain materials, such as metallic meshes.

SUMMARY OF THE DISCLOSURE

According to one embodiment, an apparatus includes a spindle, a pecking mechanism, and a clutch mechanism coupled to the pecking mechanism. The spindle includes a drill tool and the spindle is configured to be fed in a first direction during a drilling operation. The pecking mechanism is configured to retract the drill periodically during the drilling operation. The clutch mechanism is configured to selectively engage the pecking mechanism during a portion of the drilling operation.

In particular embodiments, the apparatus further includes a feed gear configured to feed the spindle in the first direction during the drilling operation. The pecking mechanism includes a bearing proximate the feed gear and a washer on proximate the bearing opposite of the feed gear. The longitudinal distance across the washer oscillates around a perimeter of the washer from maximum length to a minimum length. The washer includes a side opposite the bearing that is substantially flat.

In some embodiments, the clutch mechanism is configured to constrain the rotation of the washer such that the spindle drill is retracted a predefined distance periodically. In some embodiments, the clutch mechanism includes an engaging portion, a disengaging portion, and a cavity. The engaging portion is movable along a portion of a length of the spindle towards the washer and disposed opposing the bearing. The disengaging mechanism is disposed between the engaging portion and the washer and configured to provide a restorative force against movement of the engaging portion towards the washer. The cavity is defined on the opposite side of the engaging portion opposite the washer. The clutch mechanism is coupled to a fluid source and configured to flow fluid into the cavity, whereby the flow of fluid into the cavity causes the engaging portion to move towards the washer.

In some embodiments, the apparatus further includes a movable collar affixed to the spindle and a fluid pressure regulating mechanism. The movable collar includes a fluid seal to the side of the fluid cavity opposite of the engaging portion. The fluid pressure regulating mechanism is disposed between the fluid seal of the movable collar and the engaging portion of the fluid cavity. The fluid pressure regulating mechanism is configured to selectively release pressure within the fluid cavity.

In some embodiments, the fluid source is an air compressor and the engaging portion constrains the rotation of the washer when a pressure in the cavity exceeds a threshold pressure.

In some embodiments, the fluid source is configured to flow fluid into the cavity in response to an input based on a status of the drilling operation, the status based on one or more of a drill depth, a drill layer, a feed length, and a layer type.

In some embodiments, the fluid source is configured to flow fluid into the cavity after the spindle has been fed a predetermined length.

In particular embodiments, the clutch mechanism engages the pecking mechanism automatically after a predetermined length of the spindle is fed during the drilling operation.

In particular embodiments, the spindle includes a first portion, a second portion, and an end collar. The first portion has a larger diameter than a diameter of the second portion. The end collar is disposed on the first portion of the spindle. A position of the end collar on the spindle determines an end length of the spindle for the drilling operation. The clutch mechanism includes a clutch collar disposed on the second portion of the spindle. The clutch collar is configured to engage the clutch mechanism when the spindle is fed up to a position of the clutch collar on the spindle.

According to another embodiment, a method includes drilling a first depth into the material by continuously feeding a spindle comprising a drill tool in a direction towards the material. The method further includes engaging a pecking mechanism after drilling the first depth into the material. The pecking mechanism is configured to retract the drill tool periodically during the drilling operation. The method further includes drilling a second depth into the material by feeding the spindle with the pecking mechanism engaged.

In particular embodiments, the material includes a first layer extending a first depth into the material and a second layer below the first layer. In some embodiments, the first layer includes a metallic mesh material and the second layer includes a material different from the first layer.

In particular embodiments, the pecking mechanism includes a washer. A longitudinal distance across the washer oscillates around a perimeter of the washer from maximum length to a minimum length. The washer includes a side opposite the bearing that is substantially flat. The drill tool is periodically retracted as the bearing rotates. In some embodiments, the method further includes restraining the rotation of the washer by pneumatically engaging the washer with a movable mechanism by flowing a fluid proximate the movable mechanism. In some embodiments, the method further includes restraining the rotation of the washer in response to an input based on a status of the drilling operation, the status based on one or more of a drill depth, a drill layer, a feed length, and a layer type. In some embodiments, the rotation of the washer is restrained after drilling to the first depth into the material.

In particular embodiments, the method further includes engaging the pecking mechanism after drilling the second depth into the material.

According to yet another embodiment, an apparatus includes a spindle including a drill tool, a pecking mechanism, a clutch mechanism coupled to the pecking mechanism, and a feed gear. The spindle is configured to be fed in a first direction during a drilling operation. The pecking mechanism is configured to retract the drill periodically during the drilling operation. The clutch mechanism is configured to selectively engage the pecking mechanism during a portion of the drilling operation. The feed gear is configured to feed the spindle in the first direction during the drilling operation. The pecking mechanism includes a bearing proximate the feed gear and a washer on proximate the bearing opposite of the feed gear. A longitudinal distance across the washer oscillates around a perimeter of the washer from maximum length to a minimum length. The washer includes a side opposite the bearing that is substantially flat. The clutch mechanism is configured to constrain the rotation of the washer relative to rotation of the bearing and the feed gear such that the spindle drill is retracted a predefined distance periodically.

In particular embodiments, wherein the clutch mechanism engages the pecking mechanism automatically after a predetermined length of the spindle is fed during the drilling operation.

The present disclosure may provide numerous advantages. For example, certain embodiments provide a clutch mechanism that is configured to selectively engage the pecking mechanism during the drilling operation. For example, the clutch mechanism may be operated manually or through an automatic process to engage the pecking mechanism after drilling through a first layer of the material. In this manner, layers that may be damaged by pecking may be drilled through as part of the drilling operation while still allowing pecking for other layers of the material. As another example, certain embodiments provide the clutch mechanism controlled pneumatically, using air or another fluid to engage the pecking mechanism. The pneumatic operation may be coupled to existing pneumatic fluids used by the feed drill for easy incorporation with existing feed drills. As yet another example, the clutch mechanism may comprise a mechanical collar that engages the pecking mechanism after a certain length of the spindle is fed through the drill. In this manner, the pecking mechanism may remain disengaged until reaching a certain depth into the material being drilled.

Other technical advantages will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present disclosure and its advantages, reference is now made to the following description, taken in conjunction with the accompanying drawings, in which.

DETAILED DESCRIPTION OF THE DISCLOSURE

To facilitate a better understanding of the present disclosure, the following examples of certain embodiments are given. The following examples are not to be read to limit or define the scope of the disclosure. Embodiments of the present disclosure and its advantages are best understood by referring to FIGS. 1 through 4, where like numbers are used to indicate like and corresponding parts.

Conventional feed drills allow a pecking mechanism to be turned on or off once a drilling operation has begun. For example, once the drill begins to feed the spindle comprising the drill tooling, the drill will use pecking until the hole is finished. For monolithic materials amenable to pecking, using pecking during the entire drilling operation poses no problem. If, however, the material includes one or more layers that may be damaged by pecking, then even if other layers would benefit from peck drilling, pecking cannot be used. For example, drilling with micro-pecking may damage certain materials, such as metallic meshes, that are incorporated into composite materials.

Generally, most composite, ceramic, or glass compounds would not need a "micro-pecking" motion. However, materials that undergo a significant amount of plastic deformation in machining operations must have the swarf (broken-off chips) broken into smaller pieces by an oscillating motion. The pecking motion aids in the breakup of the swarf. These smaller chips are able to flow out of the cutting tool's flutes more easily. Materials that do not plastically deform in machining operations may not form chips, but instead form a fine powder. Examples of these types of inelastic materials would be carbon fiber reinforced polymers (CFRP) with a low matrix mass percentage, yttria-stabilized zirconia, and borosilicate glass.

Inelastic composites may not be damaged by the pecking if there is not a comparatively elastic material contained in the matrix. The copper mesh contained in the outer layer of some CFRP may be much more elastic than the rest of the CFRP, causing it to "grab" or "stick" onto the cutting tool. The pecking motion of the tool may then cause the elastic copper mesh to pull out of the CFRP, damaging the top plies of the composite.

Even if the inelastic material may not be damaged by the pecking, the pecking may be detrimental to the cutting tool. The pecking motion may increase the distance that the edge of the cutter travels through the inelastic material, thus increasing the amount of abrasion that the cutter experiences.

One application of metallic meshes are in the outer skin of an aircraft. The metallic mesh may provide a conductive path through which electrical discharge, e.g., from lightning, to travel. Since the metallic mesh is more conductive than the composite skin, there is less heat buildup resulting from a lightning strike. The lower skin temperatures may help maintain the integrity of the outer skin of the aircraft.

Accordingly, composite materials incorporating one or more layers of these sensitive materials should not be drilled with existing pecking feed drills. Non-pecking drills may be used, but this may hinder the drilling process through layers of the material that would benefit from pecking, e.g., by keeping swarf from detrimentally building up.

This disclosure contemplates apparatuses and methods to address the problems described above. For example, this disclosure contemplates providing a clutch mechanism to feed drills to selectively control the pecking mechanism of the feed drill. As another example, this disclosure contemplating methods of drilling by selectively engaging a pecking mechanism of a feed drill. By selectively engaging the pecking mechanism, the feed drill may only peck during certain portions of a drilling operation. For example, the feed drill may be controlled to only peck during certain time periods of the drilling operations or when drilling through specific layers of the target material. In this manner, feed drills may be used to drill through peck-sensitive materials but still enable pecking while drilling through materials that would not be harmed by pecking or may benefit from pecking.

The present disclosure may provide numerous advantages. For example, certain embodiments provide the clutch mechanism with a pneumatic operation, using air or another fluid to engage the pecking mechanism. The pneumatic operation may be coupled to existing pneumatic fluids used by the feed drill for easy incorporation with existing feed drills. As another example, the clutch mechanism may comprise a mechanical collar that may engage the pecking mechanism after a certain length of the spindle is fed through the drill. In this manner, the pecking mechanism may remain disengaged until reaching a certain depth into the material being drilled.

Other technical advantages will be readily apparent to one skilled in the art from the following figures, descriptions, and claims. Moreover, while specific advantages have been enumerated above, various embodiments may include all, some, or none of the enumerated advantages.

Figure 1:
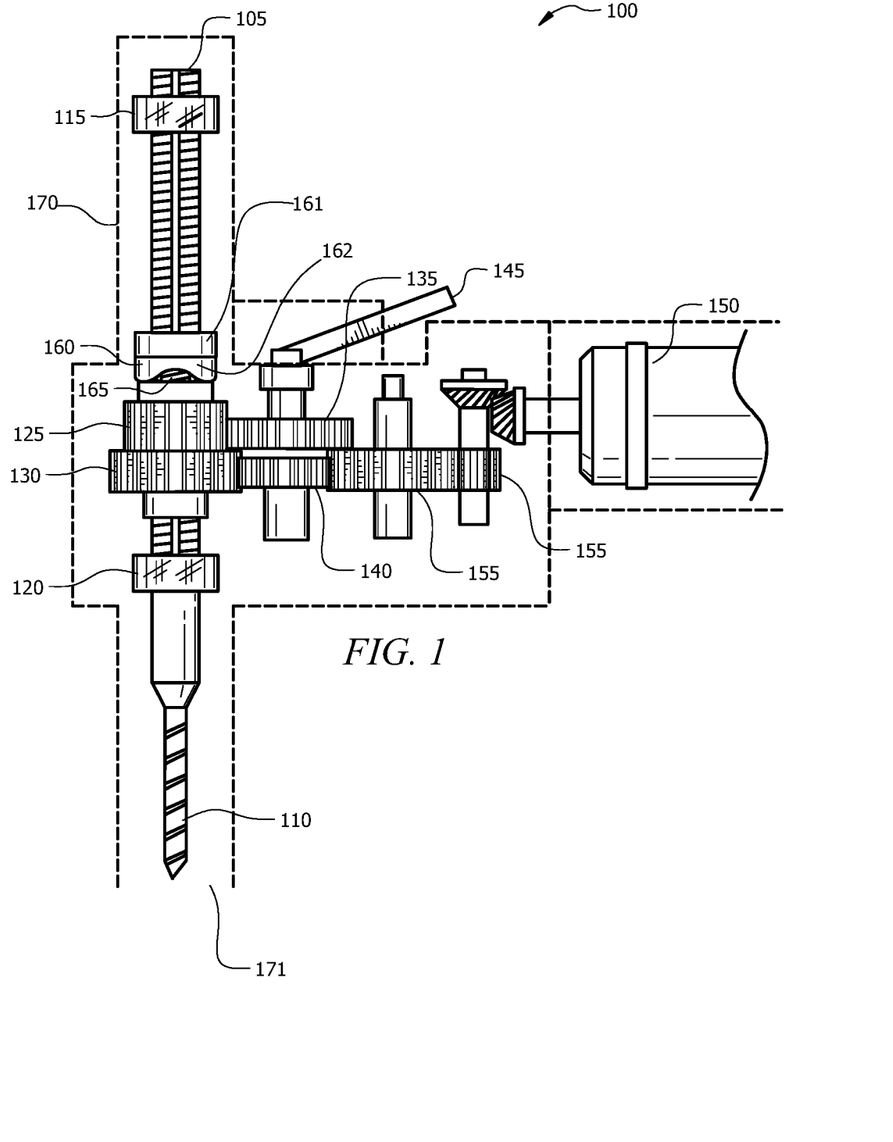
FIG. 1 illustrates an example feed drill with pecking, according to certain embodiments.
Figure 2:
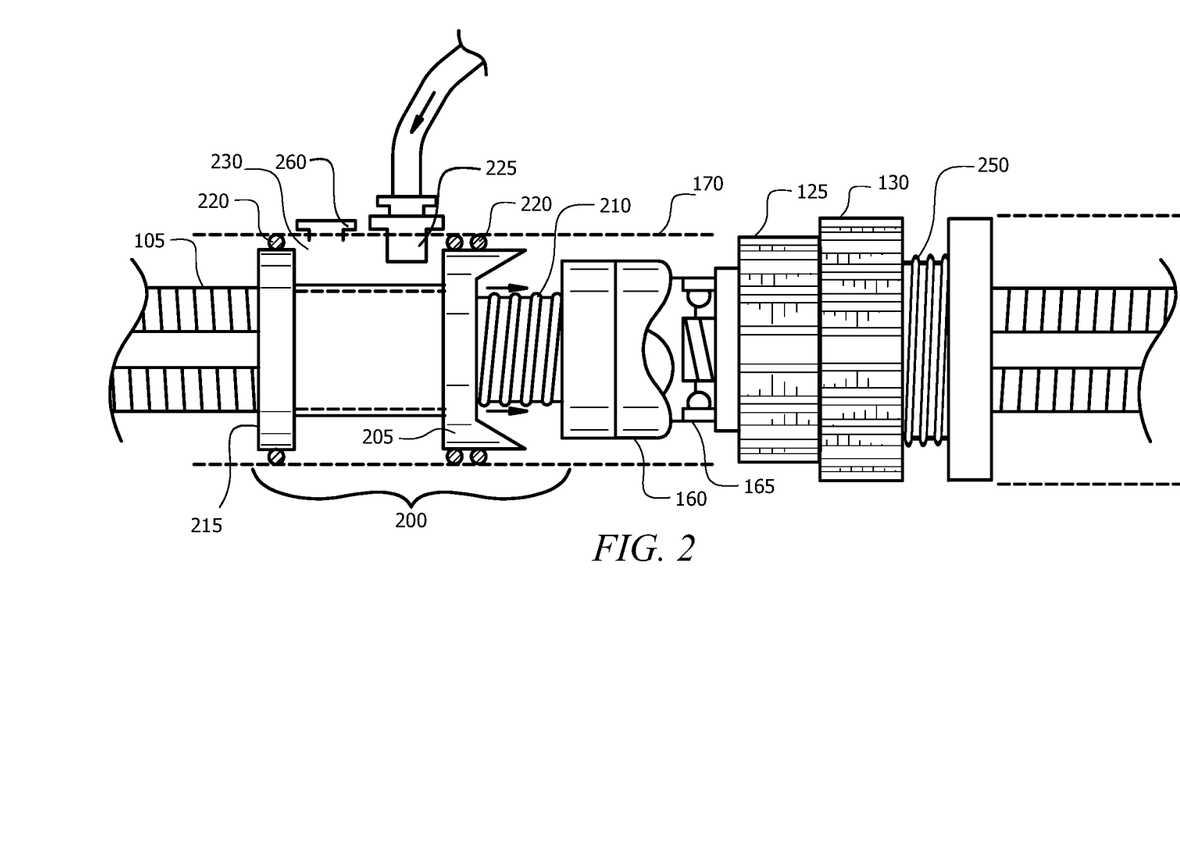
FIG. 2 illustrates an example pneumatic clutch mechanism for a feed drill, according to certain embodiments.
Figure 3A:
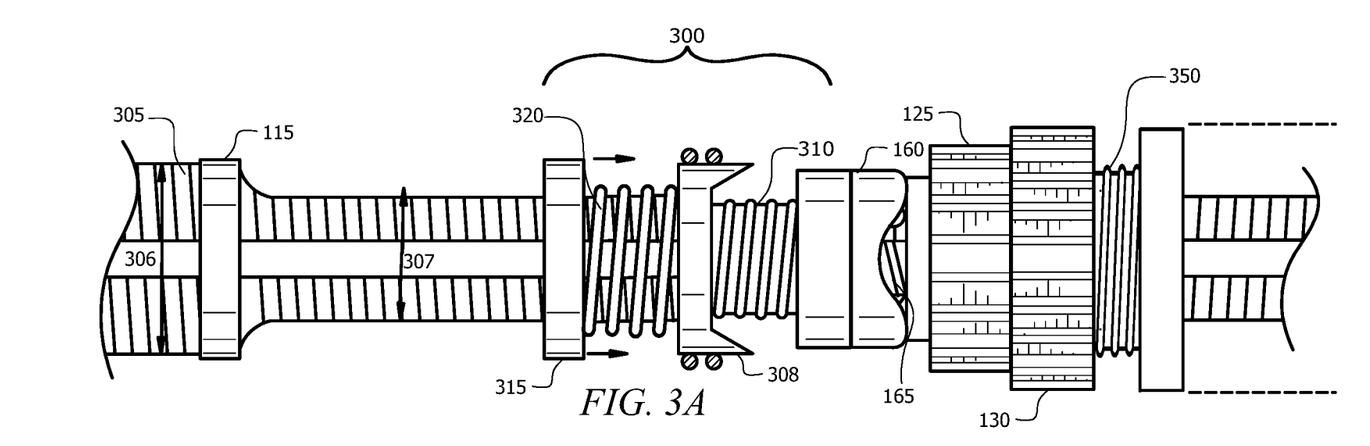
FIGS. 3A and 3B illustrate an example mechanical clutch mechanism for a feed drill when the clutch is disengaged and engaged, according to certain embodiments.
Figure 3B:
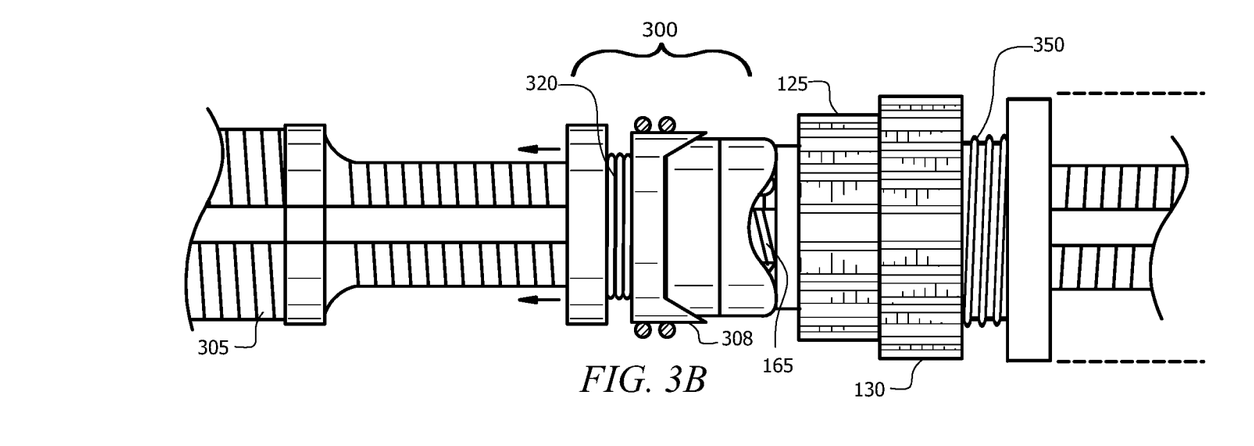
Figure 4:
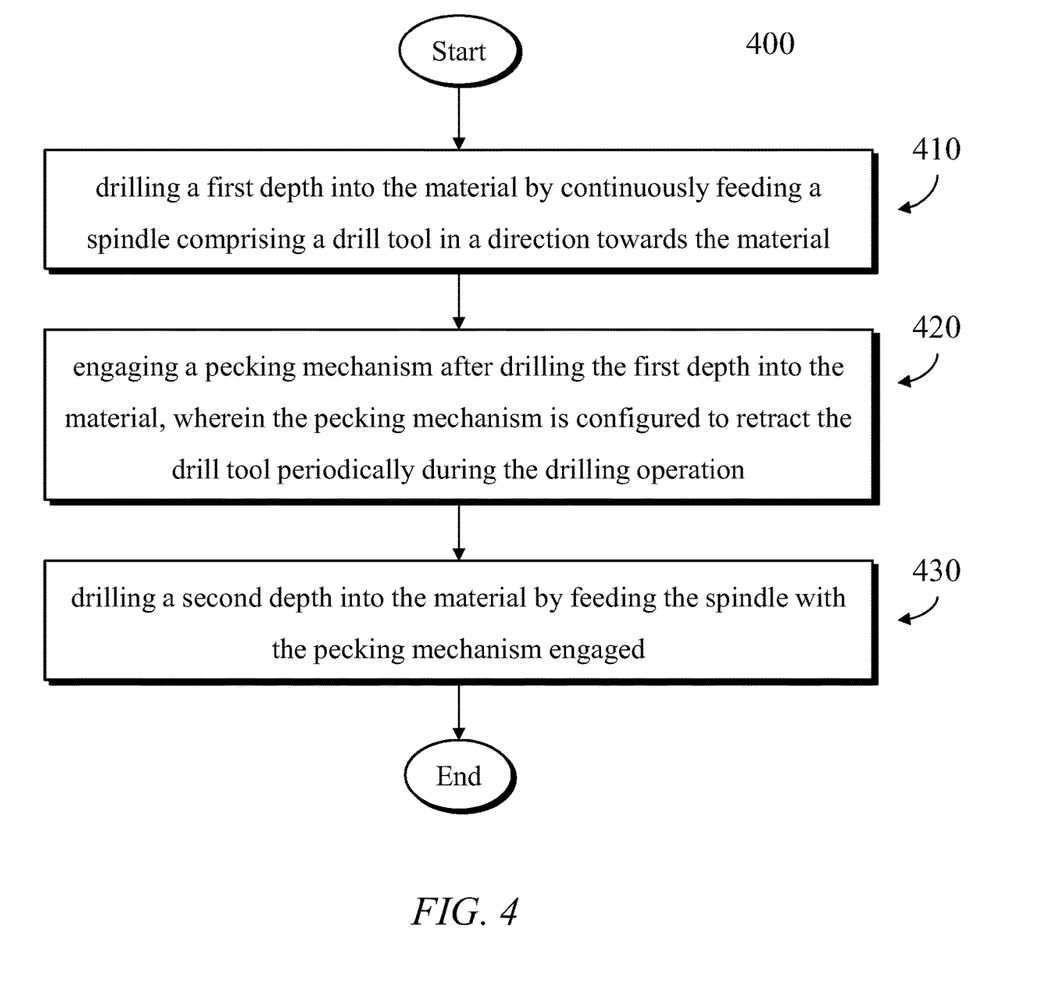
FIG. 4 is a flow chart diagram illustrating an example method of drilling a material using a feed drill with controllable pecking, according to certain embodiments.

Additional details are discussed in FIGS. 1 through 4. FIG. 1 illustrates an example feed drill with pecking. FIGS. 2, 3A, and 3B illustrate example clutch mechanisms for controlling pecking in a feed drill. FIG. 4 illustrates an example method for drilling a material with controllable pecking.

FIG. 1 illustrates an example feed drill 100 with pecking, according to certain embodiments. Feed drill 100 may include a spindle 105. Spindle 105 may be coupled to a drill portion 110. Feed drill 110 may drill into a material by causing spindle 105 and drill portion 110 to spin and advancing spindle 105 and drill portion 110 into the material as it is drilled. Once the drilling operation is complete, e.g., drill portion 110 has reached a predetermined depth, spindle 105 and drill portion 110 may be retracted. Once retracted, feed drill 100 may be used for another drilling operation.

The movement of spindle 105 and drill portion 110 may be controlled by a series of motors, gears, and mechanical components. In certain embodiments, feed drill 100 includes back collar 115 and front collar 120. Back collar 115 and front collar 120 may control the start and end points for the position of spindle 105 during the drilling operation. For example, the position of front collar 120 may determine the start location of spindle 105 at the start of the drilling operation and the position of back collar 115 may determine the end location of spindle 105 at the end of the drilling operation. Additionally, the relative positions of back collar 115 and front collar 120 may determine a stroke length of spindle 105. For example, the distance between back collar 115 and front collar 120 may be the distance spindle 105 is fed during a drilling operation, which may correlate to the distance drilled into the material. In this manner, feed drill 100 may be adjusted for the particular drilling operation of the target material.

Additionally, feed drill 100 may further include a series of mechanisms or gears that control the rotation and advancement of spindle 105. In certain embodiments, feed drill 100 includes feed mechanism 125 and spindle mechanism 130. Feed mechanism 125 may control the feeding of spindle 105 through feed drill 100. For example, feed mechanism 125 may include a gear, as illustrated, which may be caused to rotate. The rotation of feed mechanism 125 may cause spindle 105 to move forward (e.g., down towards the material to be drilled) through feed drill 100. Spindle mechanism 130 may control the rotation of spindle 105, including drill portion 110. For example, spindle mechanism 130 may include a gear, as illustrated, which may be rotated, thereby causing spindle 105 to rotate. The speed at which spindle mechanism 130 is rotated may be coupled to the rotation of spindle 105 (and thus, drill portion 110 drilling into the material). In some embodiments, spindle 105 is threaded. In some embodiments, spindle mechanism 130 is compatibly threaded such that spindle 105 may be fed through spindle mechanism 130 when feed mechanism 125 is engaged. In this manner, feed drill 100 may include one or more mechanisms, such as feed mechanism 125 and spindle mechanism 130 to control the movement of spindle 105 during a drilling operation.

While the movement of spindle 105, e.g., the rotation and advancement of spindle 105, may be controlled using feed mechanism 125 and spindle mechanism 130, in certain embodiments, feed drill 100 may include further mechanical mechanisms that aid in controlling the movement of spindle 105. In certain embodiments, feed drill 100 further includes motor 150. Motor 150 may provide power used to rotate the components of feed drill 100, such as spindle 105, feed mechanism 125, and spindle mechanism 130. Motor 150 may be any suitable motor, including a pneumatic motor or an electric motor. Motor 150 may be powered via a compressed air or electrical source. In some embodiments, feed drill 100 includes its own portable compressed air or electrical source, such that feed drill 100 is portable. For example, feed drill 100 may include a compressed air canister or a battery pack. Motor 150 may drive one or more mechanisms, such as one or more gears, coupled to feed mechanism 125 and spindle mechanism 130. In this manner, motor 150 may provide the drive power to cause feed drill 100 to carry out the drilling operation.

In certain embodiments, feed drill 100 includes one or more intermediate mechanisms between motor 150 and feed mechanism 125 and spindle mechanism 130. In certain embodiments, feed drill 100 further includes intermediary feed gear 135, intermediate spindle gear 140, and differential gears 155. For example, motor 150 may be coupled to differential gear 155 such that differential gear 155 translates that rotational motion of motor 150 into rotational motion in an orthogonal direction. Another differential gear 155 may be also coupled to step down the rotational speed, which may increase the torque applied to gears or other mechanisms further downstream from motor 150.

In certain embodiments, intermediary feed gear 135 and intermediate spindle gear 140 are coupled to differential gears 155. Intermediary feed gear 135 and intermediate spindle gear 140 may be configured to translate the rotation of differential gears 155 into the motion of spindle 105. For example, as in the illustrated example, intermediary spindle gear 140 may engage differential gear 155 such that it rotates with the rotation of differential gear 155. Intermediary spindle gear 140 may be coupled with intermediary feed gear 135 such that the rotation of intermediary spindle gear 140 is coupled with the rotation of intermediary speed feed gear 135. For example, intermediary feed gear 135 and intermediary spindle gear 140 may share an axle. In some embodiments, intermediary feed gear 135 and intermediary spindle gear 140 may have a fixed relative gear ratio such that there is a fixed relationship between the speed in which spindle 105 is fed through feed drill 100 and the speed in which spindle 105 rotates. For example, intermediary feed gear 135 may have a different diameter than intermediary spindle gear 140 even if both rotate at the same revolutions per second. In this manner, the angular velocity of feed mechanism 125 may be different than the angular velocity of spindle mechanism 130. This difference in angular velocity may cause spindle 105 to move about spindle 105's longitudinal axis through feed drill 100. In some embodiments, intermediary feed gear 135 and intermediary spindle gear 140 may have an adjustable gear ratio to allow for finer control of the drilling operation.

In certain embodiments, feed drill 100 may further include a feed engagement mechanism 145 coupled to intermediary feed mechanism 135. Feed engagement mechanism 145 may cause intermediary feed mechanism 135 to engage with differential gears 155 and or feed mechanism 125 such that feed mechanism 125 rotates and causes spindle 105 to be fed through feed drill 100. For example, intermediary feed mechanism 135 may be in a first position at the beginning of the drilling operation such that feed mechanism 125 does not rotate but spindle mechanism 130 rotates. Once the drilling operation is set to proceed, e.g., the material has been placed in the proper location and secured, feed engagement mechanism 135 may be engaged, causing intermediary feed mechanism 135 to move to a second position. In this second position, the rotation of motor 150 may be coupled through differential gears 155 and intermediary feed mechanism 135 to feed mechanism 125, thereby causing feed mechanism 125 to rotate and advance spindle 105. Once engaged, feed mechanism 135 may be engaged until reaching the end of the drilling operation.

In certain embodiments, feed drill 100 includes a pecking mechanism including oscillating washer 160 and bearing 165. Oscillating washer 160 may be uncoupled to spindle 105 such that oscillating washer 160 may not rotate with spindle 105. Bearing 165 may be positioned between oscillating washer 160 and a portion of spindle proximate feed mechanism 125. Oscillating washer 160 may include a flat surface 161 on one side and a wavy surface 162 on the opposite side such that the distance between flat surface 161 and wavy surface 162 oscillates between a minimum and a maximum distance around the perimeter of oscillating washer 160. For example, the space between oscillating washer 160 and feed mechanism 125 oscillates as bearing 165 travels around the perimeter of oscillating washer 160 with the rotation of spindle 105.

Oscillating washer 160 may be positioned proximate feed mechanism 125 such that the oscillation of spindle 105 is coupled to the rotation of bearing 165 for the entirety of the rotation of spindle 105. In this manner, oscillating washer 160 may cause spindle 105 to "peck" or periodically retract during the drilling operation. For example, during a rotation of spindle 105, bearing 165 may go through two maximum distances and two minimum distances. Thus, as spindle 105 rotates, bearing 165 may cause two periods of retraction and two periods of extension while spindle 105 is fed forward by the rotation of feed mechanism 125. In this manner, pecking may be provided to feed drill 100.

In certain embodiments, feed drill 100 may further include exterior housing 170. Exterior housing 170 may, at least partially, house the components of feed drill 100. Exterior housing 170 may define one or more holes in which portions of feed drill 100 may extend outside exterior housing 170. For example, exterior housing 170 may define an opening 171 through which drill portion 110 may extend to drill a hole within the target material.

The operation of a feed drill, such as feed drill 100, may be controlled using a wide variety of mechanisms. While feed drill 110 provides a simplified example of particular type of feed drill, the disclosed apparatuses and methods may be applied to any feed drill using pecking using an oscillating component or combination of components, such as oscillating washer 160, to provide pecking.

In conventional feed drills, the pecking mechanism is always on during the drilling operation. For example, oscillating washer 160 is conventionally uncoupled from spindle 105 such that the pecking remains constant during the drilling operation. While rotating oscillating washer 160 at the same rate of spindle 105 before and after drilling operations may change the pecking occurring during the drilling operation, conventional systems do not allow for any rotation or manipulation of the oscillating washer 160 or any other pecking mechanism once the drilling operation has started. Certain embodiments described with reference to FIGS. 2-4 provide several new solutions to provide selective control of pecking in feed drills.

FIG. 2 illustrates an example pneumatic clutch mechanism 200 for a feed drill, such as feed drill 100, according to certain embodiments. Clutch mechanism 200 includes movable portion 205, spring 210, fixed portion 215, seals 220, inlet 225, and cavity 230. Clutch mechanism 200 may be disposed adjacent to oscillating washer 160, such that movable portion 205 may be moved to constrain the rotational motion of oscillating washer 160. For example, in certain embodiments, oscillating washer 160 may initially rotate with spindle 105 such that the pecking motion is disengaged throughout its entire rotation. Movable portion 205 may then move against oscillating washer 160 constrain its rotational motion. In this manner, the movement of movable portion 205 may cause oscillating washer 160 to remain stationary. Bearing 165 then rolls around the circumference of oscillating washer 160, providing pecking of spindle 105, as described above.

In certain embodiments, the position of movable portion 205 is controlled by pneumatic action. For example, movable portion 205 and fixed portion 210 may define cavity 230 between the respective portion. Seals 220 may be disposed between movable portion 205 and fixed portion 210 and portions of exterior housing 170 around spindle 105. Seals 220 may provide an air-tight or fluid-tight seal for cavity 230.

In certain embodiments, inlet 225 allows a fluid, such as compressed air, to flow within cavity 230. For example, compressed air may be selectively introduced into cavity 230 through inlet 225 via manual operation by an operator or by an automatic control mechanism coupled to feed drill 100. The introduced fluid may increase the pressure within cavity 230. The increased pressure provides a force against movable portion 205 and, because moveable portion 205 is fixed in its position, the resulting force may cause movable portion 205 to move towards oscillating washer 160. For example, if the force caused by the introduction of compressed air within cavity 230 overcomes the spring force of spring 210, movable portion 205 may move towards oscillating washer 160 until the spring force of spring 210 matches the force of the compressed air or movable portion 205 has constrained the rotational motion of oscillating washer 160. In this manner, clutch mechanism 200 may pneumatically move movable portion 205 towards oscillating washer 160.

After a predetermined amount of pressure caused in cavity 230, movable portion 205 may reach a position that fully constrains the rotational motion of oscillating washer 160. For example, at a certain level of pressure, the spring force of spring 210 is overcome and movable portion 205 moves against oscillating washer 160, causing oscillating washer 160 to remain stationary. By maintaining that pressure within cavity 230, oscillating washer 160 may continue to remain stationary, thereby providing an oscillatory motion to bearing 165 and thus a pecking motion to spindle 105 during the drilling operation.

In certain embodiments, fluid pressure is introduced through inlet 225 into cavity 230 during the drilling operation. For example, fluid may be introduced after the drilling operation is started. In some embodiments, fluid may be introduced only after drill portion 110 of spindle 105 has drilled a certain depth or has drilled through a certain layer. For example, clutch mechanism 200 may allow a first layer of the target material to be drilled without pecking but allow subsequent layers to be drilled with pecking. In some embodiments, fluid pressure may be removed through inlet 225. For example, after the drilling operation, fluid may be released through inlet 225 such that the pressure is reduced within cavity 230 and movable portion 205 moves back towards fixed portion 215 and disengages oscillating washer 160. In this manner, feed drill 100 may be able to begin a subsequent drilling operation without pecking enabled at the start of the drilling operation. As another example, fluid pressure within cavity 230 may be released during the drilling operation such that pecking is disabled for a later portion of the drilling operation. In this manner, clutch mechanism 200 may allow an operator to control the pecking of spindle 105 and drill portion 110 during the drill operation.

In certain embodiments, clutch mechanism 200 is operated manually. For example, the control of the fluid through inlet 225 may be controlled via a button or lever, which the operator may engage during the drilling operation to turn on the pecking mechanism. In certain embodiments, clutch mechanism 200 is operated automatically. For example, clutch mechanism 200 may be coupled to a controller that controls the fluid through inlet 225. A program or computer may control when clutch mechanism 200 becomes engaged. For example, for a particular drilling operation, there may be sections or layers of the material in which pecking should be enabled or disabled. Based on these parameters, the program or computer may cause clutch mechanism 200 to be engaged.

In certain embodiments, the fluid used for engaging clutch mechanism 200 may be the same fluid used to drive motor 150. For example, motor 150 may be a pneumatic motor that uses the same fluid as clutch mechanism. Inlet 225 may receive fluid from the same source of the fluid used by motor 150. In this manner, clutch mechanism 200 may be easily integrated into existing feed drills.

In certain embodiments, a further restorative force mechanism 250 is provided to ensure contact between bearing 165, feed mechanism 125, and oscillating washer 160. For example, spring may be provided between a fixed position and spindle mechanism 130 and feed mechanism 125 to provide sufficient force to have oscillating washer 160 and bearing 165 maintain contact. In this manner, the forces that may be generated during pecking may be counteracted, thereby ensuring a consistent application of pecking when oscillating washer 160 is constrained. In some embodiments, restorative force mechanism 250 is not a spring. In some embodiments, restorative force mechanism 250 is disposed in another location. For example, restorative force mechanism 250 may be placed between spindle mechanism 130 and feed mechanism 125. As another example, restorative force mechanism 250 may be placed between feed mechanism 125 and bearing 165.

In certain embodiments, clutch mechanism 200 further comprises an optional pressure relief valve 260 to cavity 230. Using optional pressure relief valve 260 may allow back collar 115 to provide a seal to cavity 230, e.g., using seals 220. For example, pressure relief valve 260 may be engaged to relieve pressure within cavity 230 as the distance of back collar 215 and movable portion 205 decreases. In this manner, the number of mechanical parts may be reduced by using back collar 215 and seals 220 to define, in part, cavity 230 while overcoming the potential over pressuring of cavity 230 in excess of what is needed to engaged movable portion 205.

FIGS. 3A and 3B illustrate an example mechanical clutch mechanism 300 for a feed drill, such as feed drill 100, according to certain embodiments. Clutch mechanism 300 may be positioned similarly to clutch mechanism 200 proximate to oscillating washer 160. Clutch mechanism 300 includes movable portion 308, spring 310, and clutch collar 315. Similar to movable portion 205 in FIG. 2, movable portion 308 may be engaged to move towards oscillating washer 160 to engage the pecking mechanism for spindle 105 and drill portion 110. Similarly, spring 310 may be provided to restore movable portion 308 to a disengaged position.

FIG. 3A illustrates clutch mechanism 300 at a beginning of a drilling operation when pecking is not enabled. Instead of using a pneumatic system to move movable portion 308, clutch mechanism 300 may rely solely on mechanical means to engage oscillating washer 160. For example, clutch collar 315 may be moved against spring 320 which applies a force to movable portion 308, which may constrain the rotational motion of oscillating washer 160 and enable pecking in feed drill 100. In certain embodiments, clutch collar 315 is coupled to spindle 105 such that clutch collar 315 advances towards movable portion 308 when spindle 305 is advanced. For example, clutch collar 315 may maintain a fixed position relative to spindle 105 as it is advanced before compressing spring 320 enough to cause movable portion 308 to engage oscillating washer 160. In some embodiments, spring 320 may be a mechanical spring or a fluid spring.

In certain embodiments, clutch collar 315 is movable along spindle 305 before the drilling operation. For example, clutch collar 315 may be moved along spindle 305 to a set distance from movable portion 308 and oscillating washer 160. This distance may control the amount of spindle 305 that is fed before the pecking mechanism is engaged. The distance may relate to a desired depth in which drill portion 110 may drill before pecking should be enabled. For example, if pecking should not be used for the first two centimeters of drilling of the target material, clutch collar 315 may be positioned two centimeters (minus the distance across movable portion 308) from oscillating washer 160. As a result, once spindle 305 has been fed two centimeters, clutch collar 315 may push movable portion 308 to engage oscillating washer 160. In this manner, engaging the pecking mechanism may be configured based on the position of clutch collar 315 according to the particular drilling operation.

FIG. 3B illustrates clutch mechanism 300 after pecking has been engaged. In certain embodiments, spindle 305 may continue to be fed after clutch collar 315 has caused oscillating washer 160 to be constrained by movable portion 308, having overcome the restorative force 320. In some embodiments, spindle 305 is threaded and clutch collar 315 configured to rotate along the threads of spindle 305. For example, clutch collar 315 may also include threading clutch collar 315 may advance with spindle 305 until it is stopped by movable portion 308. At that time, clutch collar 315 may begin rotating along the threading of spindle 305. The drilling operation may end once back collar 115 reaches clutch collar 315 or a spindle return mechanism.

In certain embodiments, the feed drill further includes a stationary collar (not depicted) around threaded portion 307 located behind clutch collar 315, which is independent from spindle 305. In this manner, clutch collar 315 may be returned to its starting position when the spindle retracts to its starting position.

In certain embodiments, the function of back collar 115 is integrated within clutch collar 315. In some embodiments, spindle 305 includes a first diameter 306 and a second diameter 307 smaller than first diameter 306. Clutch collar 315 may be configured to rotate along the threading of spindle 305 at second diameter 307. Once clutch collar 315 reaches the portion of spindle 305 having first diameter 306, clutch collar 315 may cease to spin. Without spinning, clutch collar 315 may no longer be moved, thereby preventing further feeding of spindle 305. In this manner, providing spindle 305 with two diameters along its length, clutch collar 315 may also act as back collar 115, in addition to constraining oscillating washer 160's rotational motion.

At the end of the drilling operation, spindle 305 may be retracted back to the starting position, as configured based on front collar 120. In certain embodiments, clutch collar 315 may return to its starting position when spindle 305 is retracted. In this manner, a drilling operation may be repeated with the same parameters without resetting when pecking should be enabled. In certain embodiments, clutch collar 315 must be reset after the drilling operation to set the feed distance at which pecking is enabled for a subsequent drilling operation.

As discussed above in relation to FIG. 2, in certain embodiments, a further restorative force mechanism 350 may be provided to ensure contact between bearing 165, feed mechanism 125, and oscillating washer 160. In this manner, the forces that may be generated during pecking may be counteracted, thereby ensuring a consistent application of pecking when oscillating washer 160 is constrained. In some embodiments, restorative force mechanism 250 is not a spring. In some embodiments, restorative force mechanism 250 is disposed in another location. For example, restorative force mechanism 250 may be placed between spindle mechanism 130 and feed mechanism 125. As another example, restorative force mechanism 250 may be placed between feed mechanism 125 and bearing 165.

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components.

While the example of a spring, such as springs 210, 310, and 320 were used as providing a restorative force to help constrain the rotational motion of oscillating washer 160 when clutch mechanisms 200 and 300 are engaged, any suitable restorative force mechanism may be used. For example, any compressive material or component that resists its compression may be used. In certain embodiments, clutch mechanisms 200 and 300 do not include springs 210 and 310, respectively.

FIG. 4 is a flow chart diagram illustrating an example method 400 of drilling a material using a feed drill with controllable pecking, according to certain embodiments. At step 410, a first depth into the material may be drilled by continuously feeding a spindle comprising a drill tool in a direction towards the material. For example, spindle 105 may be advanced such that drill portion 110 drills a first distance into the target material without pecking, e.g., without engaging oscillating washer 160 via clutch mechanism 200 or clutch mechanism 300. In this manner, a first distance within the material may be drilled without pecking.

At step 420, a pecking mechanism may be engaged. For example, clutch mechanism 200 or clutch mechanism 300 may be engaged during the drilling operation to cause oscillating washer 160 to engage with feed mechanism 125 to turn on the pecking of feed drill 100. The pecking mechanism may be engaged after drilling the first distance into the material. The pecking mechanism is configured to retract the drill tool periodically during the drilling operation. For example, clutch mechanism 200 or clutch mechanism 300 causing oscillating washer 160 to be engaged with feed mechanism 125 may cause periodic retractions as the length of oscillating washer 160 oscillates with its rotation.

At step 430, a second depth is dilled into the material. The second depth is drilled by feeding the spindle with the pecking mechanism engaged. For example, spindle 105 may be fed to the second depth into the material after introducing sufficient pressure within cavity 230 of clutch mechanism 200 to engage pecking with oscillating washer 160. As another example, spindle 305 may be fed to the second depth after clutch collar forces movable portion 308 against oscillating washer 160. As a result, the material is drilled to a first depth without pecking and then drilled to a second depth with pecking. In this manner, composite components comprising one or more layers not suitable for pecking may be drilled without completely avoiding pecking during the drilling operation.

Modifications, additions, or omissions may be made to method 400 depicted in FIG. 4. Any steps may be performed in parallel or in any suitable order. Furthermore, method 400 may include more, fewer, or other steps. Additionally, while various components of feed drill 100 and clutch mechanisms 200 and 300 were discussed in relation to the steps in method 400, the steps of method 400 may be taken using any suitable component or combination of components of feed drill 100 and/or clutch mechanisms 200 and 300.

The present disclosure may provide numerous advantages, such as the various technical advantages that have been described with respective to various embodiments and examples disclosed herein. Other technical advantages will be readily apparent to one skilled in the art from the following figures, descriptions, and claims. Moreover, while specific advantages have been enumerated in this disclosure, various embodiments may include all, some, or none of the enumerated advantages.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

Although the present disclosure has been described with several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

What is claimed is:

1. An apparatus, comprising:
   a spindle comprising a drill tool, wherein the spindle is configured to be fed in a first direction during a drilling operation;
   a pecking mechanism, wherein the pecking mechanism is configured to retract the drill periodically during the drilling operation;
   a clutch mechanism coupled to the pecking mechanism, wherein the clutch mechanism is configured to selectively engage the pecking mechanism during a portion of the drilling operation;
   a feed gear configured to feed the spindle in the first direction during the drilling operation;
   wherein the pecking mechanism comprises:
      a bearing proximate the feed gear; and
      a washer proximate the bearing, wherein:
         a longitudinal distance across the washer oscillates around a perimeter of the washer from maximum length to a minimum length; and
         the washer comprises a side that is substantially flat; and
   wherein the clutch mechanism is configured to constrain the rotation of the washer relative to rotation of the bearing and the feed gear such that the spindle drill is retracted a predefined distance periodically.

2. The apparatus of claim 1, wherein the clutch mechanism engages the pecking mechanism automatically after a predetermined length of the spindle is fed during the drilling operation.

3. An apparatus, comprising:
   a spindle comprising a drill tool, wherein the spindle is configured to be fed in a first direction during a drilling operation;
   a pecking mechanism, wherein the pecking mechanism is configured to retract the drill periodically during the drilling operation;
   a clutch mechanism coupled to the pecking mechanism, wherein the clutch mechanism is configured to selectively engage the pecking mechanism during a portion of the drilling operation;
   a feed gear configured to feed the spindle in the first direction during the drilling operation; and
   wherein the pecking mechanism comprises:
      a bearing proximate the feed gear; and
      a washer proximate the bearing opposite of the feed gear, wherein:
         a longitudinal distance across the washer oscillates around a perimeter of the washer from maximum length to a minimum length; and
         the washer comprises a side opposite the bearing that is substantially flat.

4. The apparatus of claim 3, wherein:
   the clutch mechanism comprises:
   an engaging portion movable along a portion of a length of the spindle towards the washer, the engaging portion disposed opposing the bearing.

5. The apparatus of claim 4, further comprising:
   a movable collar affixed to the spindle; and
   a fluid pressure regulating mechanism disposed between the fluid seal of the movable collar and the engaging portion of the fluid cavity, wherein the fluid pressure regulating mechanism is configured to selectively release pressure within the fluid cavity.

6. The apparatus of claim 4, wherein the fluid source is an air compressor and the engaging portion constrains the rotation of the washer when a pressure in the cavity exceeds a threshold pressure.

7. The apparatus of claim 4, wherein the fluid source is configured to flow fluid into the cavity in response to an input based on a status of the drilling operation, the status based on one or more of a drill depth, a drill layer, a feed length, and a layer type.

8. The apparatus of claim 4, wherein the fluid source is configured to flow fluid into the cavity after the spindle has been fed a predetermined length.

9. The apparatus of claim 3, wherein the clutch mechanism engages the pecking mechanism automatically after a predetermined length of the spindle is fed during the drilling operation.

10. The apparatus of claim 3, wherein the spindle comprises:
    a first portion and a second portion, wherein the first portion has a larger diameter than a diameter of the second portion;
    an end collar disposed on the first portion of the spindle, wherein a position of the end collar on the spindle determines an end length of the spindle for the drilling operation; and
    wherein the clutch mechanism comprises a clutch collar disposed on the second portion of the spindle, the clutch collar configured to engage the clutch mechanism when the spindle is fed up to a position of the clutch collar on the spindle.

* * * * *